United States Patent
Gathright

(12) 
(10) Patent No.: US 6,532,694 B1
(45) Date of Patent: Mar. 18, 2003

(54) METHOD OF CASTING LURE AND MULTI CAVITY MOLD THEREFOR

(76) Inventor: Wayne Gathright, 305 Wotapi, ElDorado, AR (US) 71730

(*) Notice: Subject to any disclaimer, the term of this patent is extended or adjusted under 35 U.S.C. 154(b) by 0 days.

(21) Appl. No.: 10/034,911

(22) Filed: Jan. 2, 2002

(51) Int. Cl.$^7$ .............................................. A01K 85/00
(52) U.S. Cl. .................. 43/42.53; 264/328.1; 264/102; 425/192 R
(58) Field of Search ............................ 43/42.53, 42.24, 43/42.26, 42.28; 264/101, 102, 328.1; 425/185, 190, 192 R

(56) References Cited

U.S. PATENT DOCUMENTS

| | | | | | |
|---|---|---|---|---|---|
| 2,559,434 A | * | 7/1951 | Hyland | ...................... | 43/42.53 |
| 2,643,418 A | * | 6/1953 | Auldridge | ................. | 43/42.53 |
| 4,069,610 A | * | 1/1978 | Firmin | ...................... | 43/42.24 |
| 4,108,955 A | * | 8/1978 | Thom | ......................... | 43/42.53 |
| 4,437,257 A | * | 3/1984 | Kluge | ........................ | 43/42.53 |
| 4,551,084 A | * | 11/1985 | Lake | ........................... | 425/185 |
| 4,589,223 A | * | 5/1986 | Hastings | .................... | 43/42.53 |
| 5,037,290 A | * | 8/1991 | Curliss et al. | ........... | 264/328.1 |
| 5,057,000 A | * | 10/1991 | Mangone, Jr. | ........... | 425/192 R |
| 5,282,733 A | * | 2/1994 | Noritake et al. | ........ | 425/192 R |
| 5,358,396 A | * | 10/1994 | Antonius Giesen | ..... | 425/192 R |
| 5,484,274 A | * | 1/1996 | Neu | ............................ | 425/190 |
| 5,494,432 A | * | 2/1996 | Coggins et al. | ............ | 43/42.24 |
| 5,603,879 A | * | 2/1997 | Osada et al. | ................ | 264/102 |
| 5,695,790 A | * | 12/1997 | Lin | ......................... | 425/192 R |
| 5,725,892 A | * | 3/1998 | Gibbs | ........................ | 43/42.53 |
| 5,934,008 A | * | 8/1999 | Rice | .......................... | 43/42.26 |
| 5,946,848 A | * | 9/1999 | Ysteboe et al. | ........... | 43/42.53 |
| 6,113,827 A | * | 9/2000 | Styczynski | ............... | 264/328.1 |
| 6,170,190 B1 | * | 1/2001 | Wilson | ...................... | 43/42.24 |
| 6,213,753 B1 | * | 4/2001 | Grabbe | .................. | 425/192 R |
| 6,293,779 B1 | * | 9/2001 | Firmin | ...................... | 43/42.53 |
| 6,328,552 B1 | * | 12/2001 | Hendrickson et al. | .. | 425/192 R |
| 6,405,476 B1 | * | 6/2002 | Wiseman et al. | .......... | 43/42.53 |
| 6,408,567 B1 | * | 6/2002 | Clark | ........................ | 43/42.53 |

* cited by examiner

*Primary Examiner*—Darren W. Ark
(74) *Attorney, Agent, or Firm*—Dennis B. Haase

(57) ABSTRACT

The method of molding a fishing lure having multiple circumferentially extending skirts comprised of whiskers, in a single action, and a novel mold for casting such a lure in which platens which are mirror images of one another are formed with pockets for receiving die blocks, each having formed thereon passages in the shape of half of the lure to be cast, the passages adapted to receive plasticized material, which when cooled defines the lure.

16 Claims, 4 Drawing Sheets

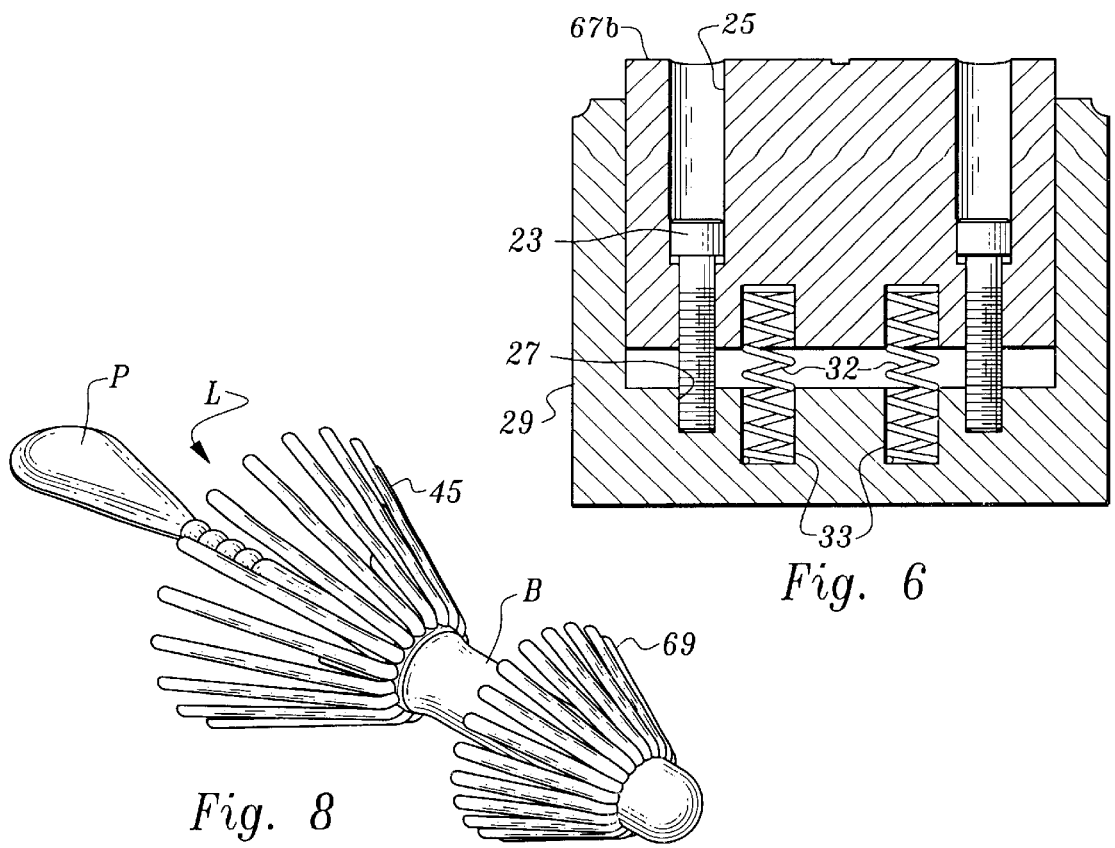
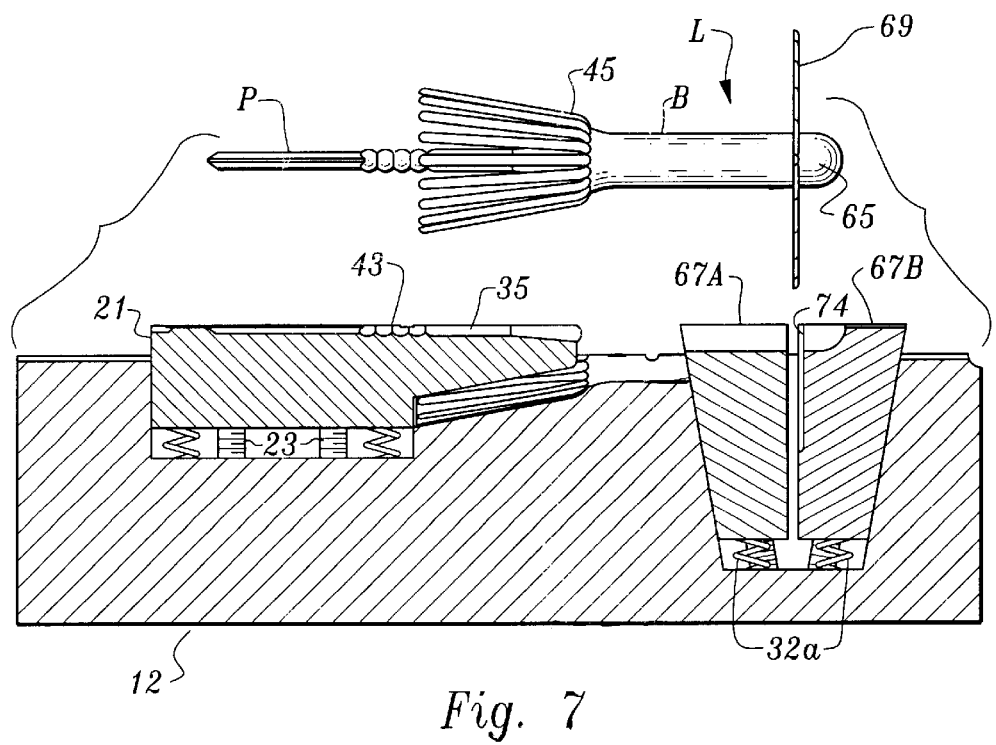

METHOD OF CASTING LURE AND MULTI CAVITY MOLD THEREFOR

The present invention relates to both means and apparatus for molding or casting a fishing lure in a unitary piece and, more particularly, to mold or cast a lure having at least one, and perhaps many, skirts having a plurality of tentacles, or whiskers, thereabout in the nature of the lure of my co-pending application Ser. No. 09/592,830.

BACKGROUND OF THE INVENTION

1. Field of the Invention

Fishing, more than a casual leisure activity, has become a passion with many, and, not unlike other such activities, those that indulge themselves in it are relatively free with their disposable income when it comes to obtaining the very latest in equipment, and, in particular, the latest lure which, like a siren, holds out the promise of instant gratification to a fish and, coincidentally, to the fisherman.

There are, seemingly, lures for every species, weather condition, water condition, and, at least as to those who view the sport as more than quiet relaxation, there is a realization that one needs different lures for different conditions.

As a consequence, the number and variety of available lures is overwhelming, and the competition for the fisherman's dollar is more than keen. Accordingly, price becomes a factor in making a decision as to what to buy, and the manufacturer that can make its lure in a cost effective manner has an edge over the competition, other factors being essentially equal.

2. Overview of the Prior Art

Many lures available today are made of a soft pliable material, the inherent flexibility resulting in an undulating, or wiggling, motion as the lure is pulled through the water. The movement attracts fish and has the appearance of being live and, thus, edible. Among such lures are several that are equipped with a plurality of whisker like appendages, typically located at the trailing end of the lure, a location which makes the casting or molding of the whiskers a relatively simple process.

More progressive innovators in the field have found that greater success can be predicated on the placement of at least some of the tentacles in the mid area of the lure, either exclusively or in conjunction with trailing whiskers. Clearly, to manufacture a lure with multiple sets of whiskers, or the like, circumscribing the body of the lure, considerable thought is required to devise a die which will accomplish molding, or casting, of the lure and to accomplish the feat with a single mold process requires significant ingenuity.

In addition to the referenced pending application, there are several lures of the general type referenced. Attention is directed to Rice U.S. Pat. No. 5,934,008, which is illustrative of the general type of construction to which the present invention has some application. However, the lure taught by Rice has opposed rows of appendages, and the fact that the rows are on opposite sides of the body of the lure, and are co planer, makes the task of construction much easier than it would otherwise be if the appendages circumscribed the body of the lure.

Reference is also made to Coggins et al. U.S. Pat. No. 5,494,432, which teaches a mold for the formation of a fishing lure which has bristles along the body of the worm, as distinguished from tentacles or whiskers.

SUMMARY OF THE INVENTION

The present invention prescribes both method and means for the creation, in commercial quantities, of a lure having a worm like body and at least a plurality of tentacles banding the mid section of the worm and, perhaps, another grouping of tentacles at the trailing edge thereof and to accomplish this objective in a single step using injection molding techniques.

It is a further objective, related to the foregoing, to accomplish the molding of a plurality of lures of the type referenced, in a single step, with a single mold or die, the terms being interchangeable for purposes of this description, with multiple cavities.

Broadly stated, it is an objective of the present invention to manufacture a fishing lure of the type described and to do so in commercial quantities and at a minimal cost. Consonant with the foregoing, it is an objective of the present invention to produce the lure of the type referenced with a minimal cycle time, thereby permitting commercial quantities to be produced in a minimum of time.

The foregoing, as well as other objectives and advantages of the present invention, will become apparent when the following detailed description of a preferred embodiment of the present invention is studied in conjunction with the accompanying drawings wherein:

DESCRIPTION OF THE DRAWINGS

FIG. 6 is a cross sectional view taken along lines 6—6 of FIG. 4, illustrating the interrelationship of the block in its pocket secured by the fasteners and with springs not being in compression;

FIG. 7 is an additional partial sectional view of a portion of the mold taken along lines 7—7, of FIG. 1 and showing all of the blocks in their operative position, and, FIG. 8 is a perspective view of the lure which is the ultimate product of the present invention.

DETAILED DESCRIPTION OF PREFERRED EMBODIMENT

Figure 1:
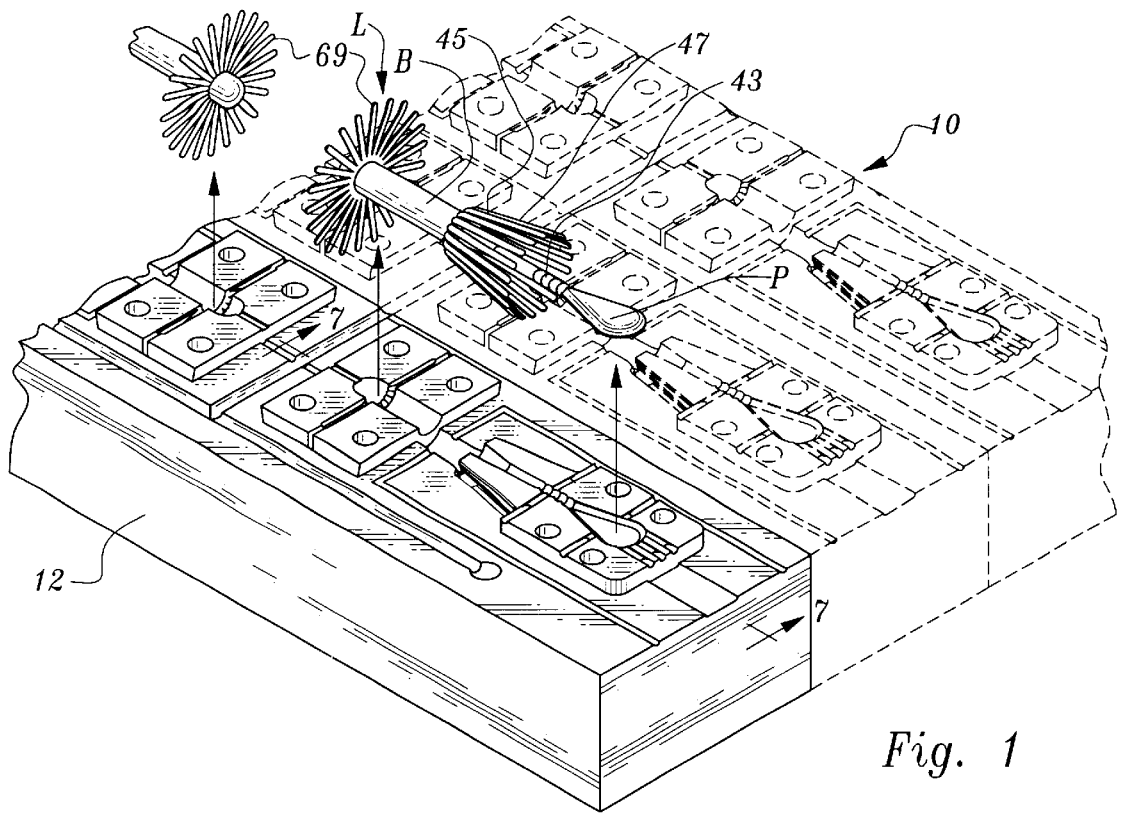
FIG. 1 is a perspective view of a portion of the base platen of a die constructed in accordance with the present invention and illustrating in considerable detail one of the cavities from which a lure is formed.
Figure 2:
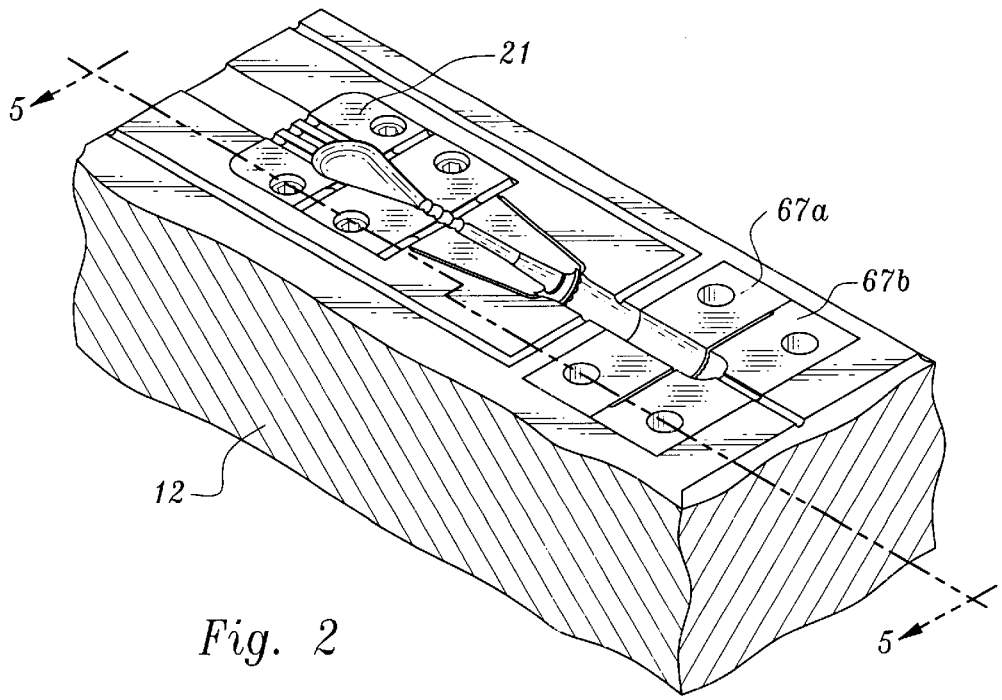
FIG. 2 is a perspective view of a typical cavity for the molding of a lure of the type described.
Figure 3:
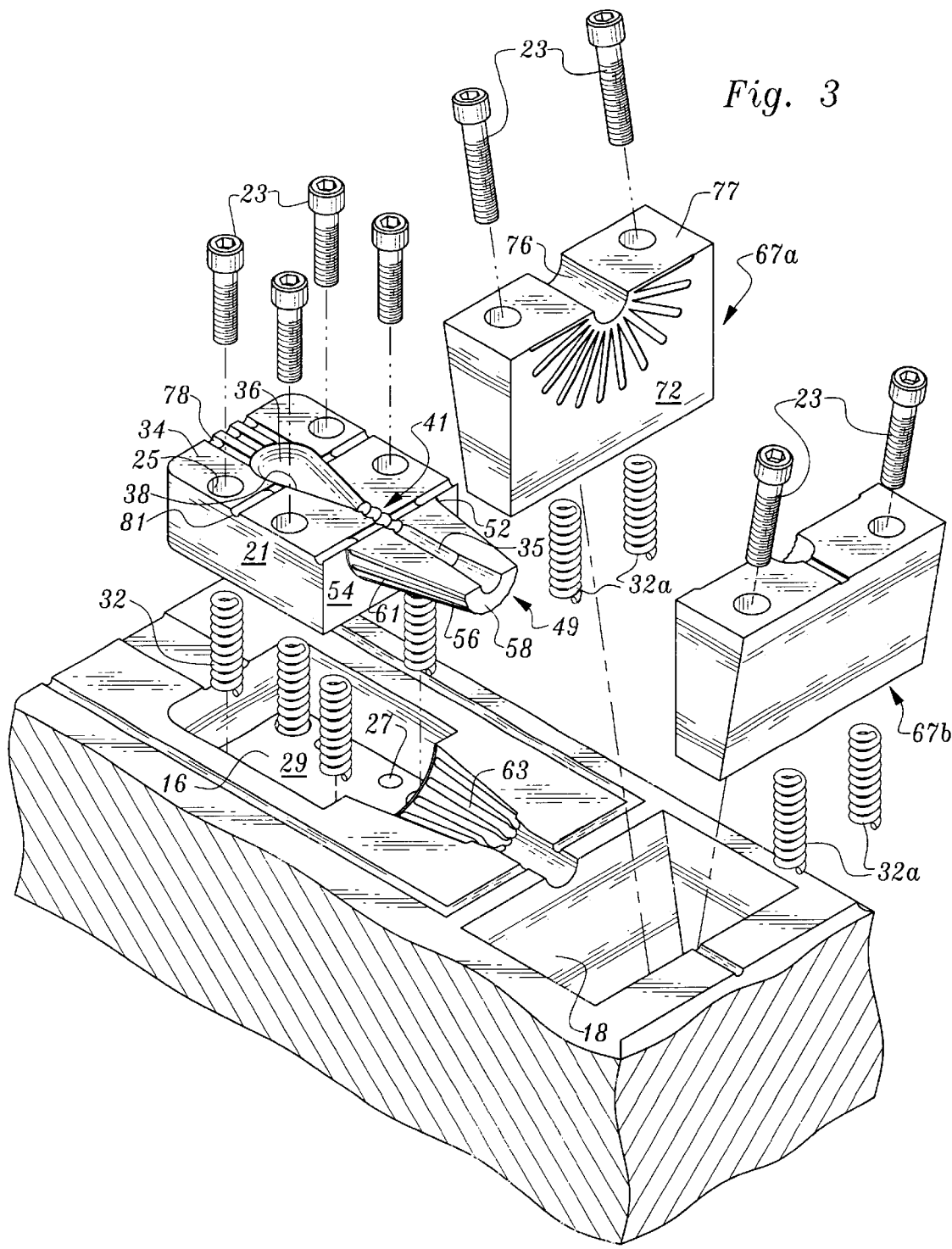
FIG. 3 is an exploded view of the cavity of FIG. 2, illustrating, in considerable detail, the construction and assembly thereof.

With reference now to the drawings, and beginning with FIG. 1, there is a die, or mold, 10 illustrated, the terms being interchangeable, at least for the purposes of this description.

Figure 4:
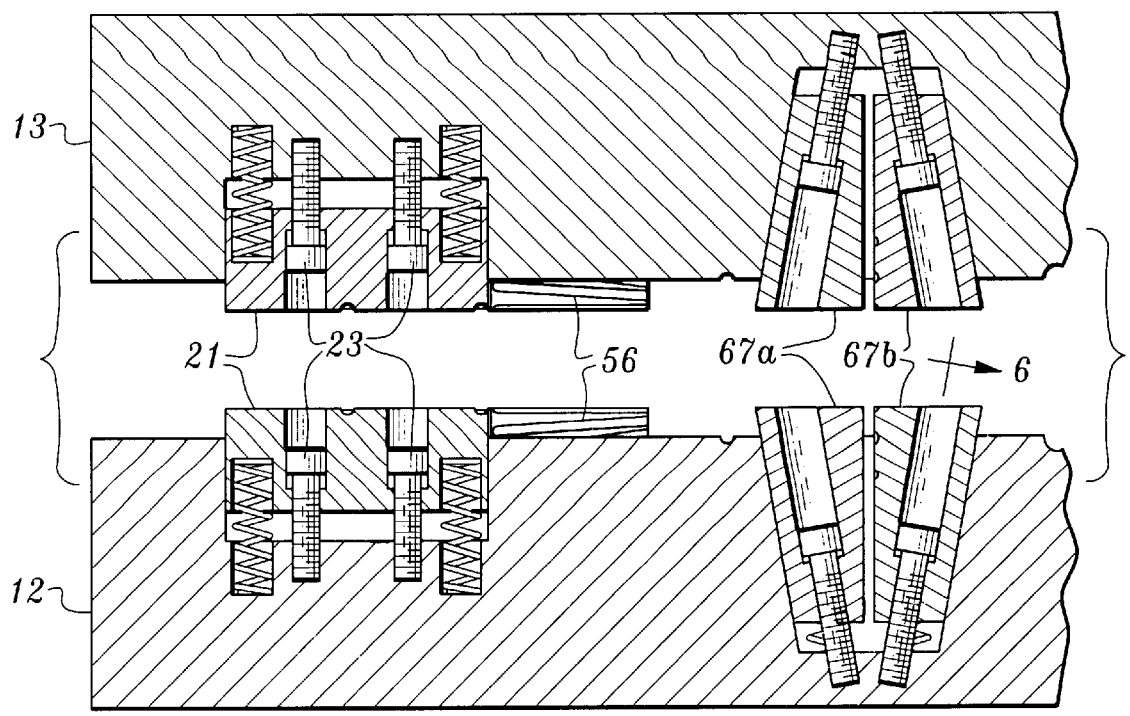
FIG. 4 is a side elevation, partially sectioned, showing a portion of the mold with the base and cap platens separated, but aligned.
Figure 5:
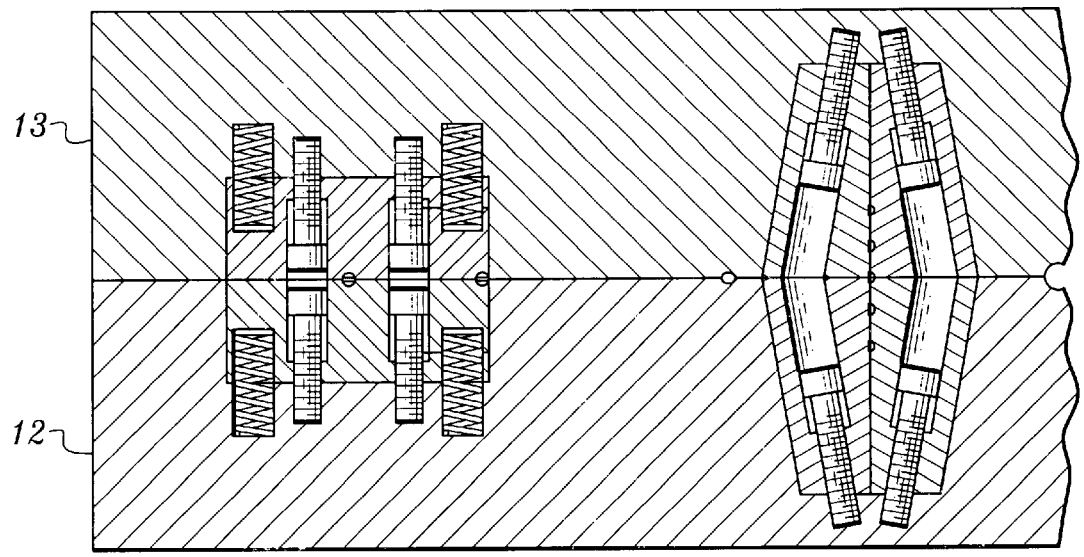
FIG. 5 is a cross sectional view taken along lines 5—5 of FIG. 2 and is similar to that of FIG. 4, with the base and cap platens fitted in place ready to receive material.

The mold includes a base platen 12. Although not illustrated in any particular detail, a cap platen 13 (FIGS. 4 and 5) which is the mirror image of the base platen, the platens together comprising the complimentary halves of a novel mold 10.

The configuration of the referenced lure L (FIG. 8) is relatively complex, at least as a molded unit, and such lures are typically formed in several steps requiring considerable time and effort. In keeping with the objective of being able to form the lure in a single step and with minimal cycle time, the base platen and the cap platen are each formed with a series of cavities, or pockets, comprising a tail pocket 16 and a collar pocket 18.

The tail pocket 16 is adapted to removably receive a rear die block 21. The block 21 is mounted in the pocket 16 by means of a series of fasteners, (reference is made to FIG. 4) in the nature of alien screws 23, as illustrated, which pass through bores 25 where they are secured in threaded bores 27 in the base 29 of the pocket 16. Obviously, there are a variety of fasteners that would accomplish the same purpose, and the alien screws are exemplary of that group of fasteners.

A series of coil springs 32, which are normally recessed and aligned in bores 33, are formed, respectively, in the block and in the base platen, and the springs are compressed when the block is mounted in the base platen 12, so as to urge the block upwardly when the fasteners 23 are loosened.

Keeping in mind that there are opposed platens which comprise the mold 10, and, in preparation for molding of the rear most portion of the body of the lure, the face 34 of the block 21 is etched, routed, or otherwise formed with a cavity 36, representing the shape and configuration of the tail P of the lure L and the rearward portion of the body of the subject lure. More particularly, the cavity 36 includes a fan, or paddle, shaped recess 38. The recess, in cooperation with the other half of the mold, combines to form the paddle tail P of the lure L.

Conjoined with the paddle portion, by means of a centrally disposed passage 35, is a continuum of the cavity 36, which is in the form of an elongate cylindrical recess 41, intended to ultimately form the body B of the lure, which is sometimes referred to in the art, as the worm. A portion of the elongate recess 41 is provided with serrations at 43 which give the body an appearance of being an insect like creature.

The most difficult part of the molding or casting process is the formation, integrally with the worm, and, in a single step, skirts comprising a series of circumferentially disposed whiskers.

In order, in keeping with this objective of the invention, to form a skirt 45 comprising a plurality of circumferentially aligned tentacles or whiskers 47, inboard of the paddle tail P, the block 21 is formed, or otherwise fixed, with a longitudinally extending appendage 49. The appendage has a frustro conical shape, the base 52 of which is either formed with, or attached to, the forward end 54 of the block 21, with the side wall 56 tapering down to the frustum 58.

In order to form the tentacles, or whiskers, 47, which comprise the skirt 45, the side wall 56, is etched, or otherwise formed, with a series of longitudinally extending, radially spaced slots 61. The slots 61 coincide with slots 63, formed in any suitable manner, at the forward end of the pocket 16, the side walls of which are shaped to receive the appendage 49. It will be appreciated, of course, that the foregoing description relates to the base platen of the mold, and that there is an identical, mirror image, portion which has not been specifically depicted or described.

It is within the contemplation of the invention that there be a second series of whisker, or tentacles, forward of and toward the head 65 of the series just described. In keeping with this aspect of the invention, a pair of opposed blocks 67a and 67b, are provided and are removably fixed in the collar pocket 18. Fasteners, such as fasteners 23, are used to secure the blocks 67a and b in the pocket 18, and springs 32a, such as those shown at 32, urge each block upwardly against the screws 23.

In order to form the whiskers 69, the transverse face 72 of each block 67a and b is etched, or otherwise formed, with a series of radially outwardly extending slots 74. The slots 74 intersect and are in fluid communication with a centrally disposed cylindrical depression 76, formed along the upper surface 77 of each block which precisely aligns with the elongate tube 41 such that when the opposed halves are assembled and the appropriate plastic material is injected, the various parts act in unison to define the worm like body of the lure L, which, by virtue of the slots 74, is also integrally formed with a skirt of whiskers about its circumferences.

In order that the mold, once assembled, may be injected with an appropriate material, such as a soft plastic, injection ports 78 are provided in order that the material, in a fluid state, may be injected into the mold. Further in keeping with the invention, vents 81 are also provided in order to prevent the formation of air pockets in the finished product.

By virtue of the unique nature of the construction of the present invention, a mold cycle has been shortened from an anticipated six minutes in more conventional molds to a precious two minutes, which is an obvious substantial saving.

While it will be appreciated that some variation in the apparatus for the implementation of the present invention is within the contemplation thereof, a preferred embodiment of the invention is presented in considerable detail and is hereinafter claimed, as follows.

Having thus described a preferred embodiment of the present invention, what is claimed is:

What is claimed is:

1. The method of forming a worm like lure having a head, a worm like body and a paddle tail and including multiple skirts of circumferentially spaced whiskers integrally formed with said worm like body, in a single process comprising:

providing a base platen and a cap platen, said platens adapted to be secured in face to face relation, together to define a mold;

forming each said platen of said mold with a tail pocket and a collar pocket;

providing a first die block, said first die block being removably received in said tail pocket, forming a cavity in said first die block in the shape of a paddle, said cavity further having a centrally disposed passage in fluid communication with said cavity;

said collar pocket being formed in each said platen in spaced relation to said tail pocket;

providing a pair of opposed second die blocks, said opposed die blocks adapted to be received in said collar pocket in mating face to face relation, said mating faces being formed with a series of radially outwardly extending recesses formed thereon, a centrally disposed passage formed in said second die blocks, said passage being axially aligned with said passage in said first die block passage in said tail pocket;

and passage means in said mold for receiving plasticized material, and injecting a plasticized material into said cavities and allowing the said plasticized material to cool to form a lure.

2. The method as set forth in claim 1, wherein said platens are formed as mirror images of one another.

3. The method as set forth in claim 2, wherein said passage means comprises a matrix of passages which is formed in surfaces of said platens, said matrix extending from the cavities in said platens when said platens are in face to face relation to outer extremities of said mold, said passages adapted to receive plasticized material to thereby form said lure.

4. The method as set forth in claim 2, wherein a series of vents is provided, said vents being formed in surfaces of said platens and vented to an exterior of the mold to permit air from said cavities to be exhausted there through.

5. The method set forth in claim 1, wherein said passage means comprises a matrix of passages which is formed in surfaces of said platens, said matrix extending from the cavities in said platens when said platens are in face to face relation to outer extremities of said mold, said passages adapted to receive plasticized material to thereby form said lure.

6. The method set forth in claim 1, wherein a series of vents is provided, said vents being formed in surfaces of said platens and vented to an exterior of the mold to permit air from said cavities to be exhausted there through.

7. The method as set forth in claim 1, wherein said first die block and said opposed second die blocks being supported in said platens by resilient means for urging said die blocks outwardly of said platens when said platens are separated.

8. A mold for casting a worm-like lure having a head, a worm like body and a paddle tail and including multiple skirts of circumferentially spaced whiskers integrally formed with said worm like body, in a single process, said mold comprising, in combination:
   a base platen and a cap platen, said platens adapted to be secured in face to face relation, together to define a mold;
   each said platen having a tail pocket and a collar pocket;
   a first die block, said first die block being removably received in said tail pocket, said first die block having a cavity formed therein, said cavity including having a paddle shape at one end thereof, further having a centrally disposed passage in fluid communication with said cavity;
   said collar pocket being formed in each said platen in spaced relation to said tail pocket;
   a pair of opposed second die blocks, said opposed die blocks adapted to be received in said collar pocket in mating face to face relation, said mating faces being formed with a series of radially outwardly extending recesses, a centrally disposed passage formed in said second die blocks, said passage being axially aligned with said passage in said first die block in said tail pocket;
   and passage means in said mold for receiving plasticized material.

9. The mold as set forth in claim 8, wherein said platens are mirror images of one another.

10. The mold as set forth in claim 9, wherein said passage means comprises a matrix of passages which is formed in surfaces of said platens, said matrix extending from the cavities in said platens when said platens are in face to face relation, to outer extremities of said mold, said passages adapted to receive plasticized material to thereby form said lure.

11. The mold as set forth in claim 9, wherein a series of vents are provided in said mold, said vents being formed in surfaces of said platens and vented to an exterior of the mold to permit air from said cavities to be exhausted there through when plasticized material is introduced.

12. The mold as set forth in claim 9, wherein said first die block and said opposed second die blocks are supported in said platens by resilient means for urging said die blocks outwardly of said platens when said platens are separated.

13. The mold as set forth in claim 9, wherein a series of vents are provided in said mold, said vents being formed in surfaces of said platens and vented to an exterior of the mold to permit air from said cavities to be exhausted there through when plasticized material is introduced;
   said first die block and said opposed second die blocks are supported in said platens by resilient means for urging said die blocks outwardly of said platens when said platens are separated.

14. The mold set forth in claim 8, wherein said passage means comprises a matrix of passages which is formed in surfaces of said platens, said matrix extending from the cavities in said platens when said platens are in face to face relation, to outer extremities of said mold, said passages adapted to receive plasticized material to thereby form said lure.

15. The mold set forth in claim 8, wherein a series of vents are provided in said mold, said vents being formed in surfaces of said platens and vented to an exterior of the mold to permit air from said cavities to be exhausted there through when plasticized material is introduced.

16. The mold as set forth in claim 8, wherein said first die block and said opposed second die blocks are supported in said platens by resilient means for urging said die blocks outwardly of said platens when said platens are separated.

* * * * *